(12) United States Patent  (10) Patent No.: US 7,096,733 B2
Ohta et al.  (45) Date of Patent: Aug. 29, 2006

(54) ANGULAR VELOCITY SENSOR

(75) Inventors: Kazuhiro Ohta, Yokohama (JP);
Masanori Yachi, Yokohama (JP);
Katsuhiko Takahashi, Yokosuka (JP)

(73) Assignee: Fujitsu Media Devices Limited, Yokohama (JP)

( * ) Notice: Subject to any disclaimer, the term of this patent is extended or adjusted under 35 U.S.C. 154(b) by 0 days.

(21) Appl. No.: 10/998,167

(22) Filed: Nov. 29, 2004

(65) Prior Publication Data

US 2005/0120794 A1 Jun. 9, 2005

Related U.S. Application Data

(63) Continuation of application No. PCT/JP03/06605, filed on May 27, 2003.

(30) Foreign Application Priority Data

May 28, 2002 (JP) ............................ 2002-154651

(51) Int. Cl.
*G01P 9/04* (2006.01)
(52) U.S. Cl. ................. 73/504.16; 73/504.12
(58) Field of Classification Search ............. 73/504.16, 73/504.12
See application file for complete search history.

(56) References Cited

U.S. PATENT DOCUMENTS 6,134,963 A 10/2000 Ishikawa et al.
6,810,735 B1 * 11/2004 Kaneko et al. ............... 73/493

FOREIGN PATENT DOCUMENTS

| EP | 0 995 972 A1 | 4/2000 |
| JP | 9318364 | 12/1997 |
| JP | 19800333 | 7/1998 |
| JP | 2002022452 | 1/2002 |

* cited by examiner

*Primary Examiner*—Hezron Williams
*Assistant Examiner*—John Hanley
(74) *Attorney, Agent, or Firm*—Arent Fox PLLC

(57) ABSTRACT

An angular velocity sensor includes a stem and a vibrator that is supported by the stem. The vibrator is inclined to a mounting surface of the stem. The angle of inclination of the vibrator to the mounting surface is adjustable. For this reason, the angular velocity sensor also includes a holding member that holds the vibrator. This holding member is elastically deformable. A single material may be folded to shape the holding member.

17 Claims, 13 Drawing Sheets

GO TO DIFFERENTIAL AMPLIFIER

ANGULAR VELOCITY SENSOR

CROSS-REFERENCE TO RELATED APPLICATION

This nonprovisional application is a continuation application of and claims the benefit of International Application Number PCT/JP03/06605, filed May 27, 2003. The disclosure of the prior application is hereby incorporated herein in its entirety by reference.

BACKGROUND OF THE INVENTION

1. Field of the Invention

This invention generally relates to an angular velocity sensor, and more particularly, to an angular velocity sensor that employs a piezoelectric vibrator.

2. Description of the Related Art

An angular velocity sensor detects the angular velocity when an object is rotating. Angular velocity sensors are in use for avoiding blurring of images due to hand movement in taking a picture, position detection systems such as car navigation systems, and attitude control systems for automobiles and robots. Any inclination of a detection axis against a detection reference plane causes a detection error or an improper detection of another axis. In the above-mentioned case, an accurate angular velocity cannot be detected. Therefore, a control system equipped with the angular velocity sensor will suffer from various problems caused resulting from angular errors in detection. For example, with respect to a car navigation system, the angular velocity sensor is generally housed in the dashboard of a car. In the case where the control system equipped with the angular velocity sensor is installed in the dashboard, if the detection axis is parallel to the ground surface that is the reference plane, the angular velocity can be detected accurately.

The dashboards of a number of cars, however, are not parallel to the ground surface. In the case where the control system is installed in an inclined dashboard, the detection axis of the angular velocity sensor is also inclined, the detection error of the angular velocity becomes greater, and similarly, the improper detection of another axis occurs more often. FIGS. 1A and 1B show the above-mentioned case. The horizontal axis in FIG. 1A denotes the angle of sensor inclination (°), and the vertical axis in FIG. 1A denotes the detection error of angular velocity (%). The horizontal axis in FIG. 1B denotes the angle of sensor inclination (°), and the vertical axis in FIG. 1B denotes the improper detection of another axis (%). In addition, it is necessary to newly install a tilting table in a dashboard or attach the tilting table to the sensor, if the detection axis of the sensor needs to be parallel to the ground surface. As a result, a larger space is required.

SUMMARY OF THE INVENTION

It is a general object of the present invention to solve the above-mentioned drawback and provide the angular velocity sensor that can adjust the detection axis appropriately to the detection reference plane of the angular velocity even if the sensor is installed on an inclined surface and that can downsize the whole system.

More specifically, the present invention intends to provide the angular velocity sensor that can adjust the direction of the detection axis readily.

According to one aspect of the present invention, there is provided an angular velocity sensor may include a support, a vibrator that is supported by the support, and a circuit board supported by the support, and the vibrator is inclined to the support within a plane parallel to the circuit board. The angular velocity sensor is inclined to the support within plane parallel to the circuit board, and even if the angular velocity sensor is installed on the inclined surface, it is possible to adjust the detection axis in a proper direction. In addition, the axis of the vibrator, which is the smallest unit in the detection axis, is inclined, and it is thus possible to minimize the dead space caused resulting from the inclination. With the above-mentioned angular velocity sensor, an angle of inclination of the vibrator to the support may be adjustable. With the above-mentioned angular velocity sensor may further include a holding member that holds the vibrator so that the angle of inclination of the vibrator to the support can be adjusted. With the above-mentioned angular velocity sensor, the holding member may be deformable, and holds the vibrator. With the above-mentioned angular velocity sensor, the holding member may have a single member that is folded. With the above-mentioned angular velocity sensor, may further include a vibrator supporting substrate that secures the vibrator, a circuit board and a frame that holds the vibrator supporting substrate and the circuit board. The axis of the vibrator is inclined within the surface that is parallel to the circuit board, and it is thus minimize the dead space. With the above-mentioned angular velocity sensor, may further include a vibrator supporting substrate that secures the vibrator and a frame that holds the vibrator supporting substrate and the circuit board, and the frame sandwiches and holds the vibrator supporting substrate. With the above-mentioned angular velocity sensor, may further include a vibrator supporting substrate that secures the vibrator and a frame that holds the vibrator supporting substrate and the circuit board, and the frame may be made of an deformable material so that an angle to the support can be adjusted. With the above-mentioned angular velocity sensor, the frame may be engaged with multiple sides of the circuit board. With the above-mentioned angular velocity sensor, may further include a vibrator supporting substrate that secures the vibrator, a circuit board, and a frame that holds the vibrator supporting substrate and the circuit board, and the circuit board is arranged on a first side of the frame and the vibrator and the vibrator supporting substrate are arranged on a second side of the frame. With the above-mentioned angular velocity sensor, the vibrator supporting substrate may have a concave portion, and the frame has a holding member that is fit into the concave portion. With the above-mentioned angular velocity sensor, the angular velocity sensor may be connected to electrodes that are arranged on the vibrator, and has external connection terminals that pierce the support. With the above-mentioned angular velocity sensor, the circuit board may further include a circuitry connected to the vibrator and pads for external connection. With the above-mentioned angular velocity sensor, may further include a frame that is provided to cover the circuit board, and a circuit board holding portion of the frame is in contact with pads, the circuit board holding portion being engaged with the circuit board. With the above-mentioned angular velocity sensor, may further include a vibrator supporting substrate that secures the vibrator and a frame that holds the vibrator supporting substrate and the circuit board, and the vibrator supporting substrate is composed of multiple layers. With the above-mentioned angular velocity sensor, preferably, the vibrator is a tuning fork vibrator or a vibrating reed vibrator. With the above-mentioned angular velocity sensor, the vibrator may be a block shape of a vibrating reed vibrator. With the above-mentioned angular velocity sensor, multiple arms composing the tuning fork vibrator may stand side by side within a plane parallel to the circuit board.

According to another aspect of the present invention, there is provided an angular velocity sensor may include a support, a vibrator, and a holding member that holds the vibrator on the support, and the holding member is deformable and an angle of a detection axis is adjustable by deforming the holding member. With the above-mentioned angular velocity sensor, the holding member may hold the vibrator so that the detection axis of the vibrator may be inclined to the support. With the above-mentioned angular velocity sensor, the holding member may hold the vibrator so that the detection axis of the vibrator may be parallel to the support.

BRIEF DESCRIPTION OF THE DRAWINGS

Preferred embodiments of the present invention will be described in detail with reference to the following drawings, wherein.

DESCRIPTION OF THE PREFERRED EMBODIMENTS

A description will now be given, with reference to the accompanying drawings, of embodiments of the present invention.

First Embodiment

Figure 1A:
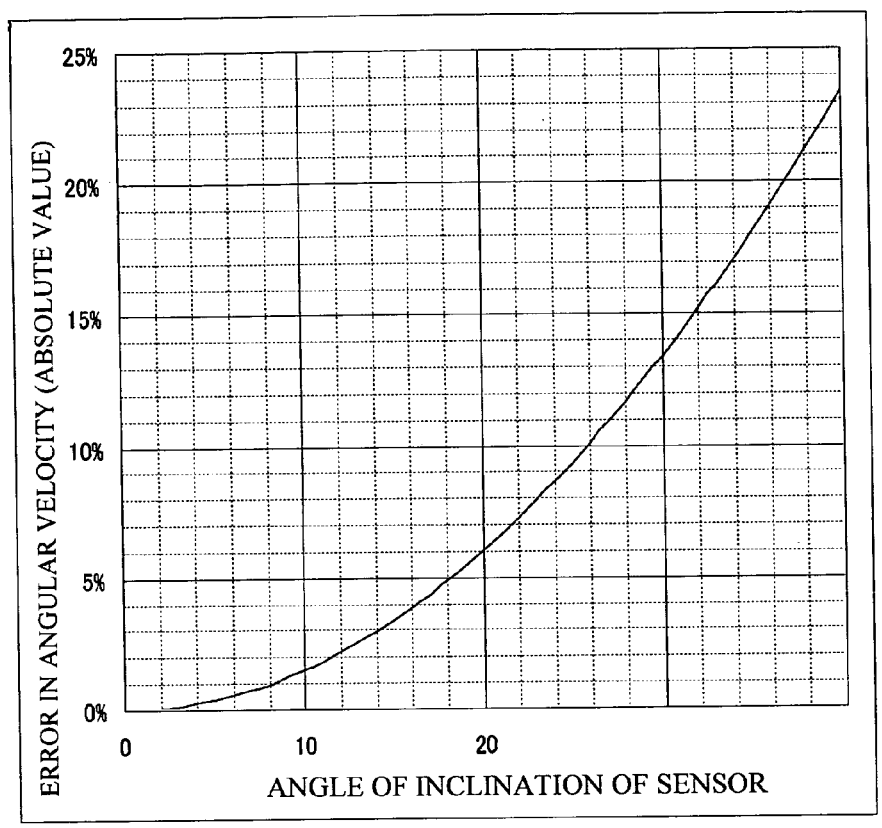
FIGS. 1A and 1B are graphs describing drawbacks of the conventional techniques.
Figure 1B:
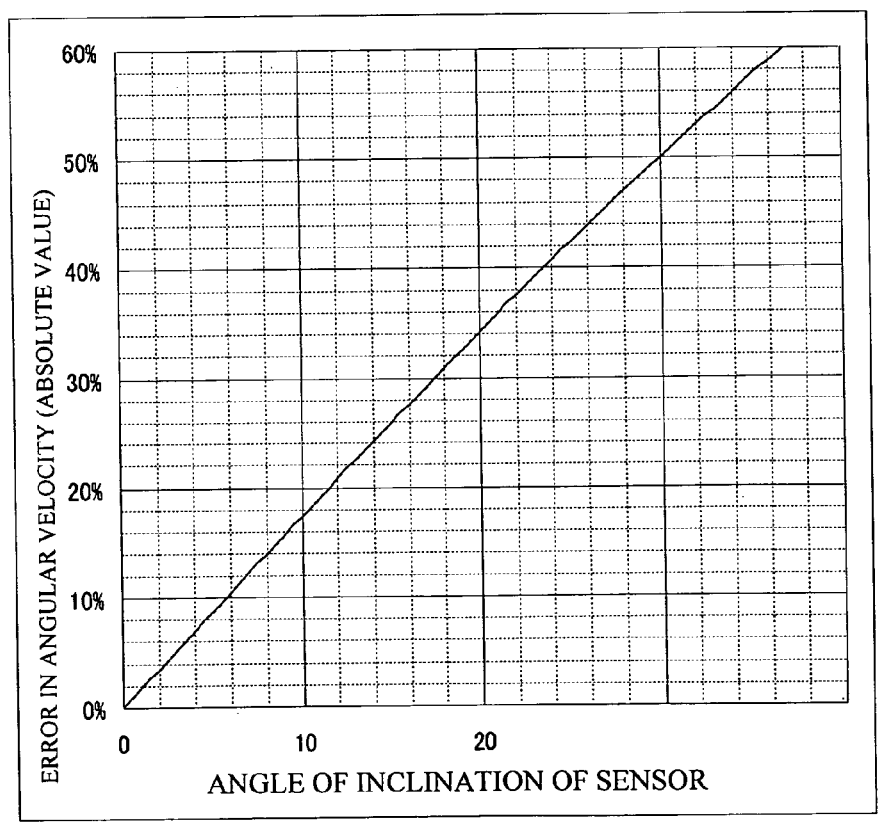
Figure 2:
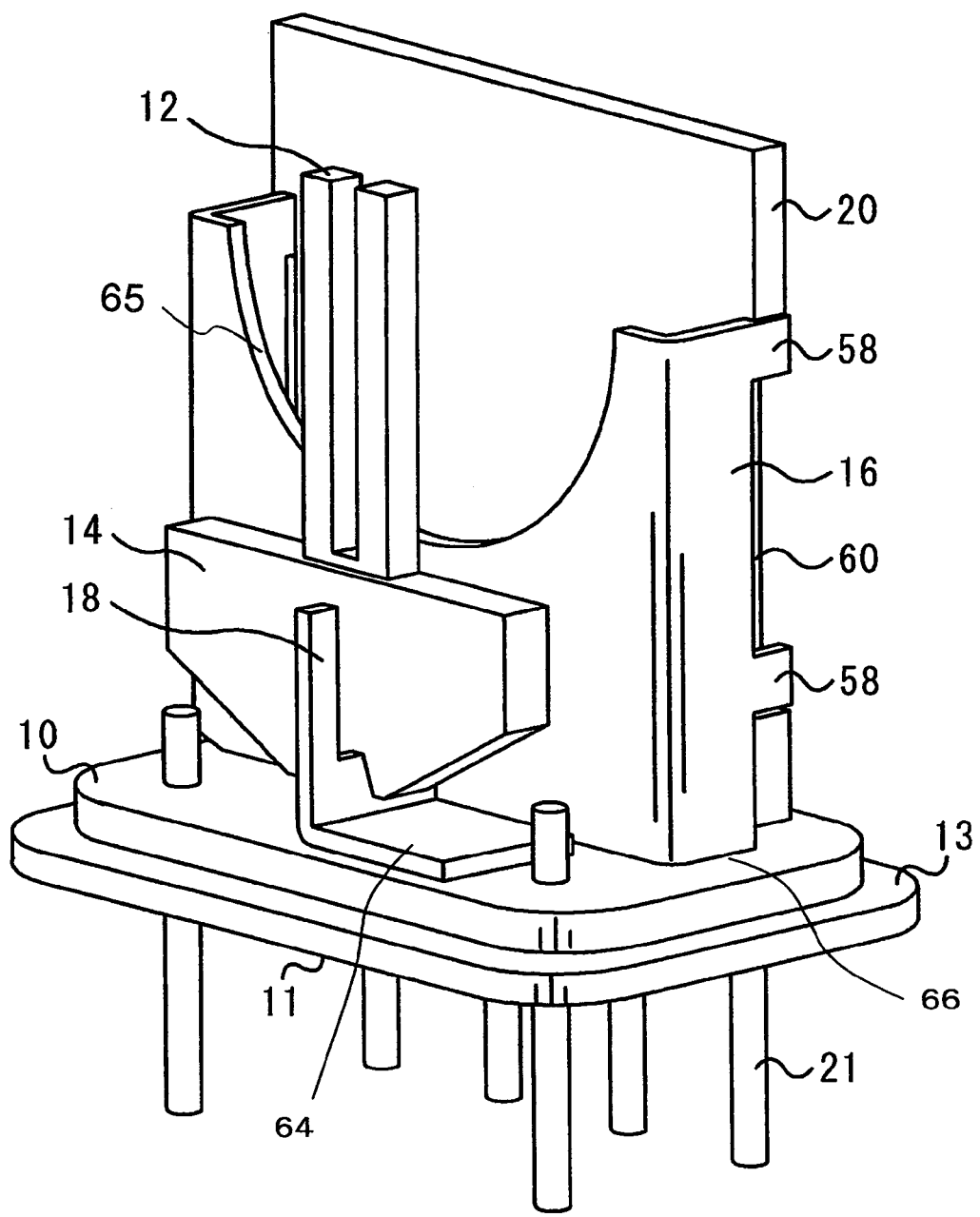
FIG. 2 is a perspective view of an angular velocity sensor in accordance with a first embodiment of the present invention.
Figure 3:
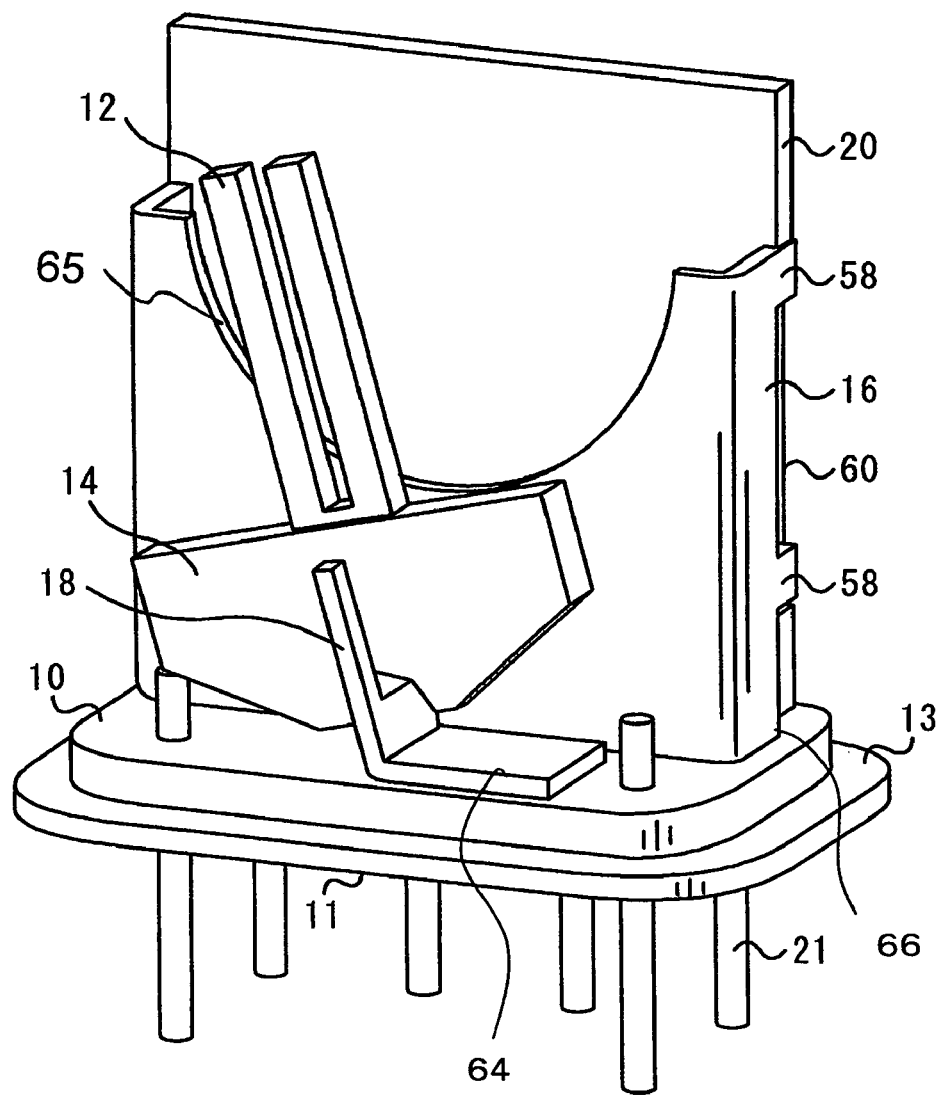
FIG. 3 is another perspective view of the angular velocity sensor in accordance with the first embodiment of the present invention.

A description will be given of a first embodiment of the present invention, with reference to drawings. FIGS. 2 and 3 are perspective views of an angular velocity sensor in accordance with a first embodiment of the present invention. FIG. 2 shows a case where the angle of inclination of a vibrator is 0° FIG. 3 shows a case where the vibrator is inclined. The angular sensor includes a support 10, a vibrator 12, a vibrator supporting substrate 14, a frame 16, a holding member 18, a circuit board 20, and multiple external connection terminals 21. The holding member 18 is made of deformable material. The angle of the vibrator 12 can be adjusted arbitrarily by elastically deforming the holding member 18, as shown in FIG. 3. The angular velocity sensor shown in FIG. 2 is suitable for the case where the support 10 is installed on the surface that is parallel to the reference plane (the ground surface), or where the detection axis of the vibrator 12 is vertical to the reference plane (the ground surface) even if the system having the angular velocity sensor is installed on the surface inclined to the reference plane. In contrast, as shown in FIG. 3, the detection axis of the angular velocity sensor 12 is vertical to the reference plane, which is the ground surface, in the case where the vibrator 12 or the system equipped with the vibrator 12 is installed on the inclined surface to the reference plane (the ground surface). That is, the angular velocity sensor in FIG. 3 is suitable for the case where the angular velocity sensor or the system having the same is installed on the surface that is inclined to the reference plane. The angular velocity sensor is installed so that a mounting surface 11 of the support 10 may substantially be parallel to a motherboard of the system having the vibrator 12. The circuit board 20 is installed substantially vertical to the support 10 or the mounting surface 11. The vibrator 12 is inclined on a plane parallel to the circuit board 20. The angle of inclination can be adjusted readily by deforming the holding member 18 that is made of a deformable material.

The angular velocity sensors as shown in FIGS. 2 and 3 can be set vertical to the reference plane readily regardless of the angle of inclination, even if the surface on which the angular velocity sensor is installed is inclined such as the dashboard. It goes without saying that the detection axis of the sensor is vertical to the reference plane, when the sensor is installed. In the case where the angle of inclination is predetermined when the vibrator 12 is installed, the vibrator 12 is secured at the predetermined angle in advance to produce the holding member 18 with the material that is not deformed. Components of the angular velocity sensor in accordance with the first embodiment of the present invention will be described in detail.

Figure 4A:
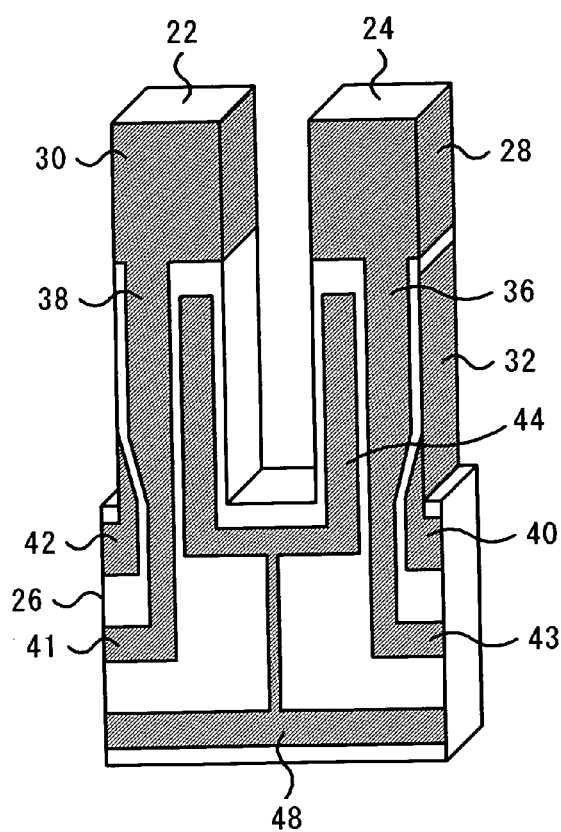
FIG. 4A shows a surface side of a vibrator in accordance with the first embodiment of the present invention.
Figure 4B:
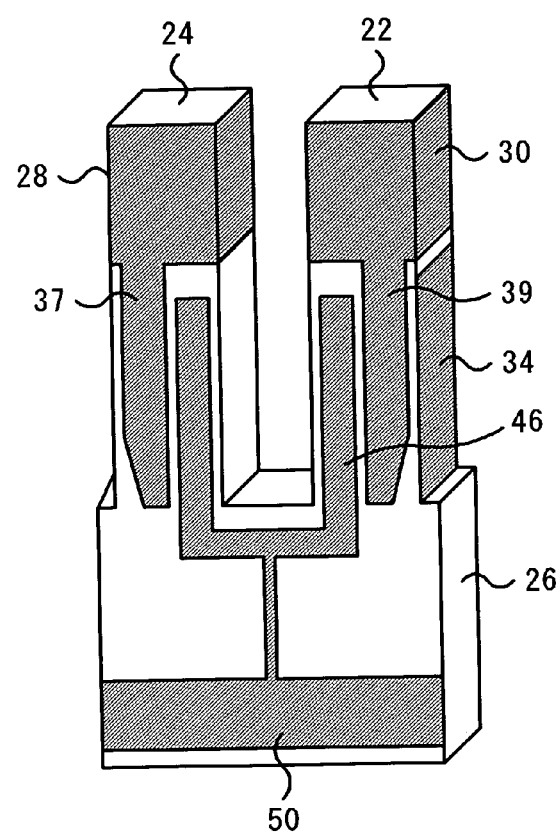
FIG. 4B shows a backside of the vibrator in accordance with the first embodiment of the present invention.

FIGS. 4A and 4B are perspective views of the vibrator 12. FIG. 4A shows a surface side of the vibrator 12. FIG. 4B shows a backside of the vibrator 12. The vibrator 12 is a tuning fork vibrator including two arms 22 and 24 and a base 26. The base 26 joins the arms 22 and 24. The vibrator 12 is made of piezoelectric material. For example, a single crystal piezoelectric material such as $LiNbO_3$ and $LiTaO_3$ is used. The detection axis of the vibrator 12 is a direction in which the two arms extend. In the arms 22 and 24, a detecting electrode and a driving electrode are formed as follows. Detecting electrodes 34, 38, and 39 are arranged in the arm 22. Detecting electrodes 32, 36, and 37 are arranged in the arm 24. The detecting electrodes 38 and 39 are coupled via a round electrode 30 that wraps around an upper part of the arm 22. The detecting electrode 38 is connected to an extraction electrode 41, which extends toward the base 26. The detecting electrode 34 is arranged on an external side face of the arm 22. The detecting electrode 34 is extracted onto the base 26 by an extraction electrode 42. The detecting electrodes 36 and 37 are connected together on a round electrode 28 that wraps around an upper part of the arm 24. The detecting electrode 36 is connected to an extraction electrode 43 that is arranged on the base 26. The detecting electrode 32 is arranged on an external side face of the arm 24, and is extracted onto the base 26 by an extraction electrode 40. The driving electrode 44 is arranged on the surface side with a U-shape pattern. The U-shape pattern is formed on the arms 22 and 24. The driving electrode 44 is extracted onto the surface of the base 26 by an extraction electrode 48. The driving electrode 46 is arranged on the backside with a U-shape pattern. The U-shape pattern is formed on the arms 22 and 24. The driving electrode 46 is extracted onto the backside of the base 26 by an extraction electrode 50.

Figure 5A:
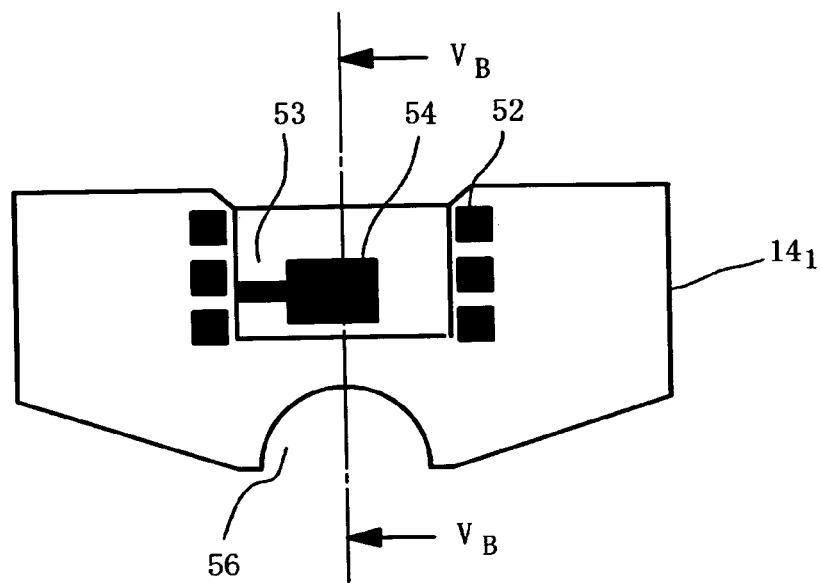
FIG. 5A is a top view of a supporting substrate in accordance with the first embodiment of the present invention.
Figure 5B:
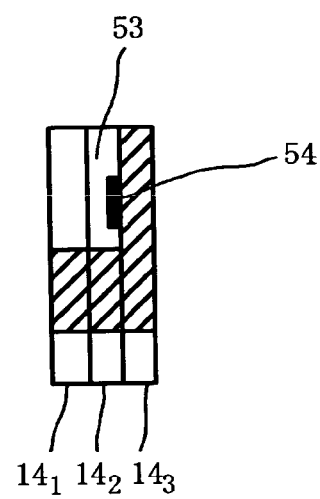
FIG. 5B is a cross sectional view taken along a line $V_B$—$V_B$ shown in FIG. 5A.
Figure 5C:
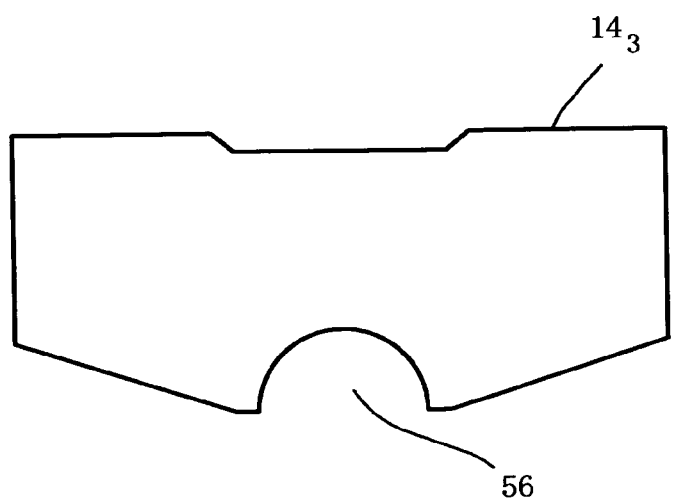
FIG. 5C is a bottom view of the supporting substrate in accordance with the first embodiment of the present invention.

FIGS. 5A, through 5C illustrate a vibrator supporting substrate 14. FIG. 5A is a top view of the supporting substrate 14. FIG. 5B is a cross sectional view taken along a line $V_B$—$V_B$ shown in FIG. 5A. FIG. 5C is a bottom view of the supporting substrate 14. Referring to FIG. 5B, the vibrator supporting substrate 14 has a three-layer structure composed of substrates $14_1$, $14_2$, and $14_3$, which are made of aluminum, for example. A concave portion 53 is formed in the substrates $14_1$ and $14_2$. The base 26 of the vibrator 12 is fit into the concave portion 53. Pads 52 are arranged around the concave portion 53 as shown in FIG. 5A. An electrode 54 is arranged on the bottom. The electrode 54 is coupled to one of the pads 52 through an internal via connection. When the vibrator 12 is fit into the concave portion 53, the extraction electrode 50, which is shown in FIG. 4B, comes into contact with the electrode 54. A conductive adhesive agent is applied to the concave portion 53 to secure the vibrator 12 to the vibrator supporting substrate 14. The extraction electrodes 40, 41, 42, 43, and 48, which are arranged on the surface of the vibrator 12, are electrically coupled to the corresponding pads 52 with the use of bonding wires or conductive paste, for example. The vibrator 12 also includes another concave portion 56. The concave portion 56 and the concave portion 53 face each other. The concave portion 56 penetrates through the three layers $14_1$, $14_2$, and $14_3$ of the vibrator supporting substrate 14. The holding member 18 is fit into the concave portion 56, and is secured with a silicon-based adhesive agent, for example.

Figure 6A:
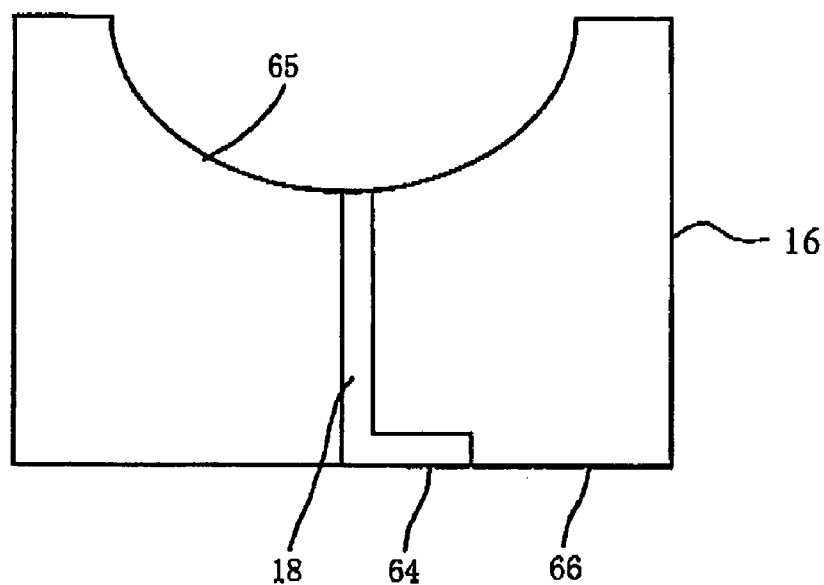
FIG. 6A is a top view of a frame and a holding member in accordance with the first embodiment of the present invention.
Figure 6B:
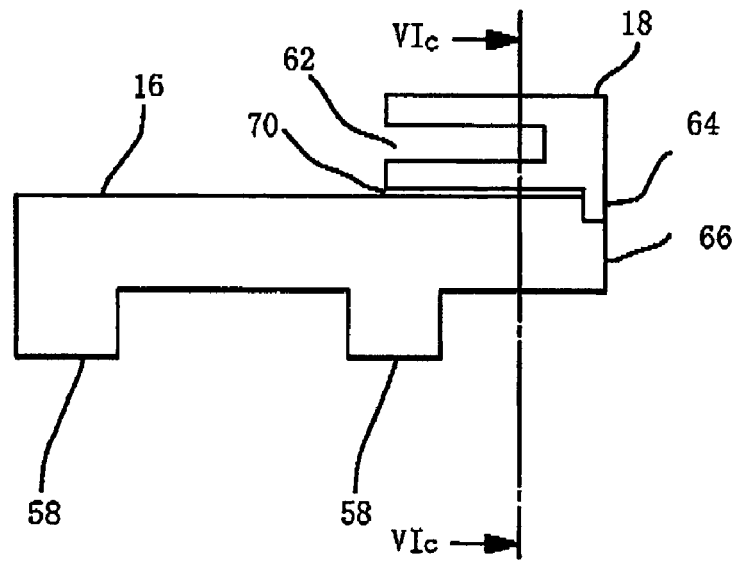
FIG. 6B is a side view of the frame and the holding member in accordance with the first embodiment of the present invention.
Figure 6C:
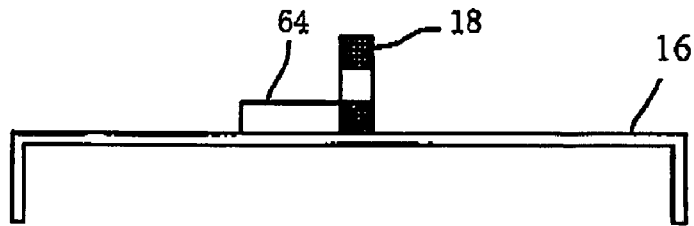
FIG. 6C is a cross sectional view taken along a line $VI_C$—$VI_C$ shown in FIG. 6B.

FIGS. 6A through 6C illustrate a frame 16 and the holding member 18. FIG. 6A is a top view of the frame 16 and the holding member 18. FIG. 6B is a side view of the frame 16 and the supporting member 18. FIG. 6C is a cross sectional view taken along a line $VI_c$—$VI_c$ shown in FIG. 6B. The frame 16 is made of a conductive material, for example, nickel-plated cobal or nickel-plated phosphor bronze. The frame 16 has a C-shape of cross section, and has circuit board holding portions 58 on the side face thereof. The circuit board holding portions 58 are engaged with the circuit board 20. Specifically, as shown in FIGS. 2 and 3, a cut out portion 60 having the C-shape is arranged on the side face of the circuit board 20. The circuit board holding portions 58 are engaged with corners of the cut out portion 60. That is, the circuit board holding portions 58 hold the circuit board 20 by sandwiching the side faces of the circuit board 20. The circuit board holding portions 58 are secured to the circuit board 20 with the use of adhesive or solder. The circuit board holding portions 58 are engaged with the side faces of the circuit board 20, as described. Instead, holes may be provided inside the circuit board 20 so as to insert the circuit board holding portions 58. In addition, other methods may be employed so as to hold the circuit board 20. The frame 16 has the C-shape of cross section, and a gap is created between the circuit board 20 and the inner surface of the frame 16. This gap prevents electronic parts mounted on the circuit board 20 from touching the frame 16. Additionally, the frame 16 has an arch-shape of cut out portion 65. An electric connection is established between the vibrator supporting substrate 14 and the circuit board 20 by interconnection lines that pass through the cut out portion 65, such as wires or the like.

The holding member 18 is arranged on the vibrator supporting substrate 14. Referring to FIG. 6B, the holding member 18 has a C-shape of cross section. The vibrator supporting substrate 14 is fit into a gap 62 created by the holding member 18. In this case, the vibrator supporting substrate 14 is attached onto the holding member 18 so that the inner surface, on which the pads 52 are provided, may face the frame 16. The holding member 18 includes a holding part 64. The holding part 64 is secured onto a bottom portion 66 of the frame 16 with the use of an adhesive agent. A concave portion that corresponds to the holding part 64 is formed on the bottom portion 66 of the frame 16, and is engaged with the holding part 64. The holding member 18 is also made of a conductive material, for example, nickel-plated cobal or nickel-plated phosphor bronze, in the same manner as the frame 16. This means that the holding member 18 is deformable, as shown in FIG. 6A. A slight gap 70 is created between the bottom face of the holding member 18 and the top face of the frame 16. The gap 70 is provided so that the angle of the frame 16 to the bottom portion 66 may be adjusted readily by deforming the holding member 18. The holding member 18 is deformed to adjust the angle of the frame 16 to the bottom portion 66. This makes it possible to adjust the angle of inclination of the detection axis of the vibrator 12.

Figure 7:
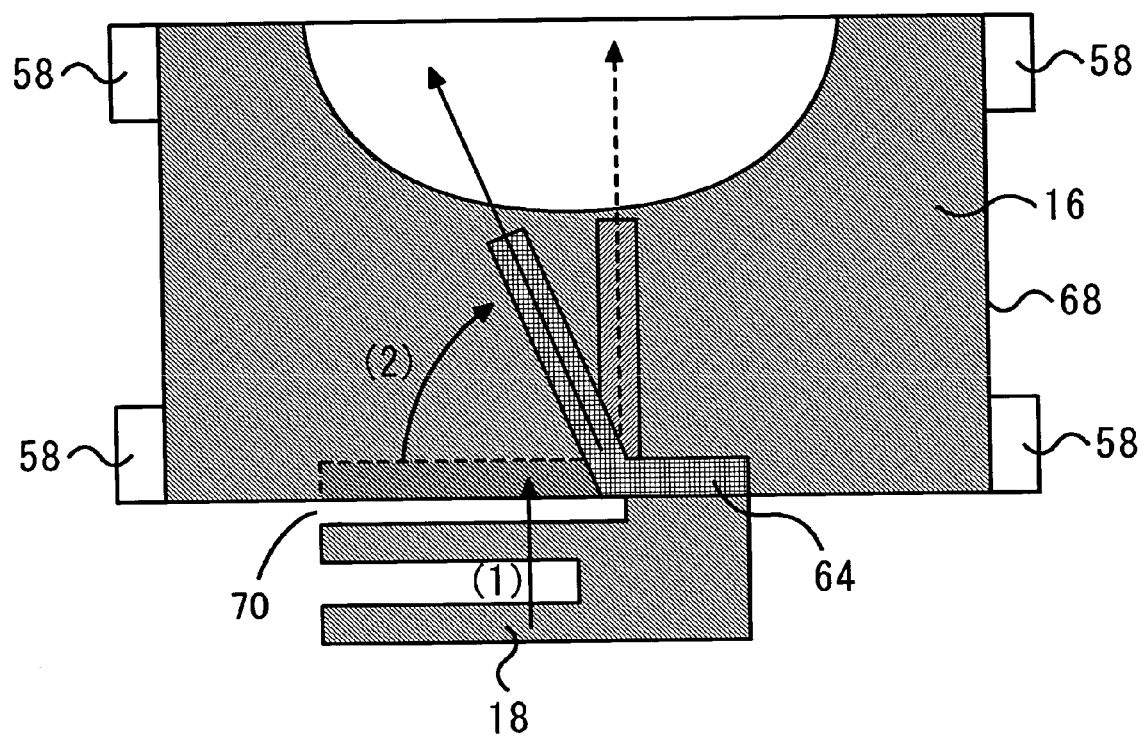
FIG. 7 is a developed view of the frame and the holding member made of an deformable member in accordance with the first embodiment of the present invention.

Referring to FIG. 7, the frame 16 and the holding member 18 may be formed with a single member 68. FIG. 7 is a developed view of the single member 68. The single member 68 is folded as shown. The developed holding member 18 is folded as shown in (1) in FIG. 7 to have a C-shape, and is folded at the center of the holding part 64 as shown in (2) in FIG. 7. In this case, as a matter of course, the holding part 64 is a part of the single member 68.

Figure 8:
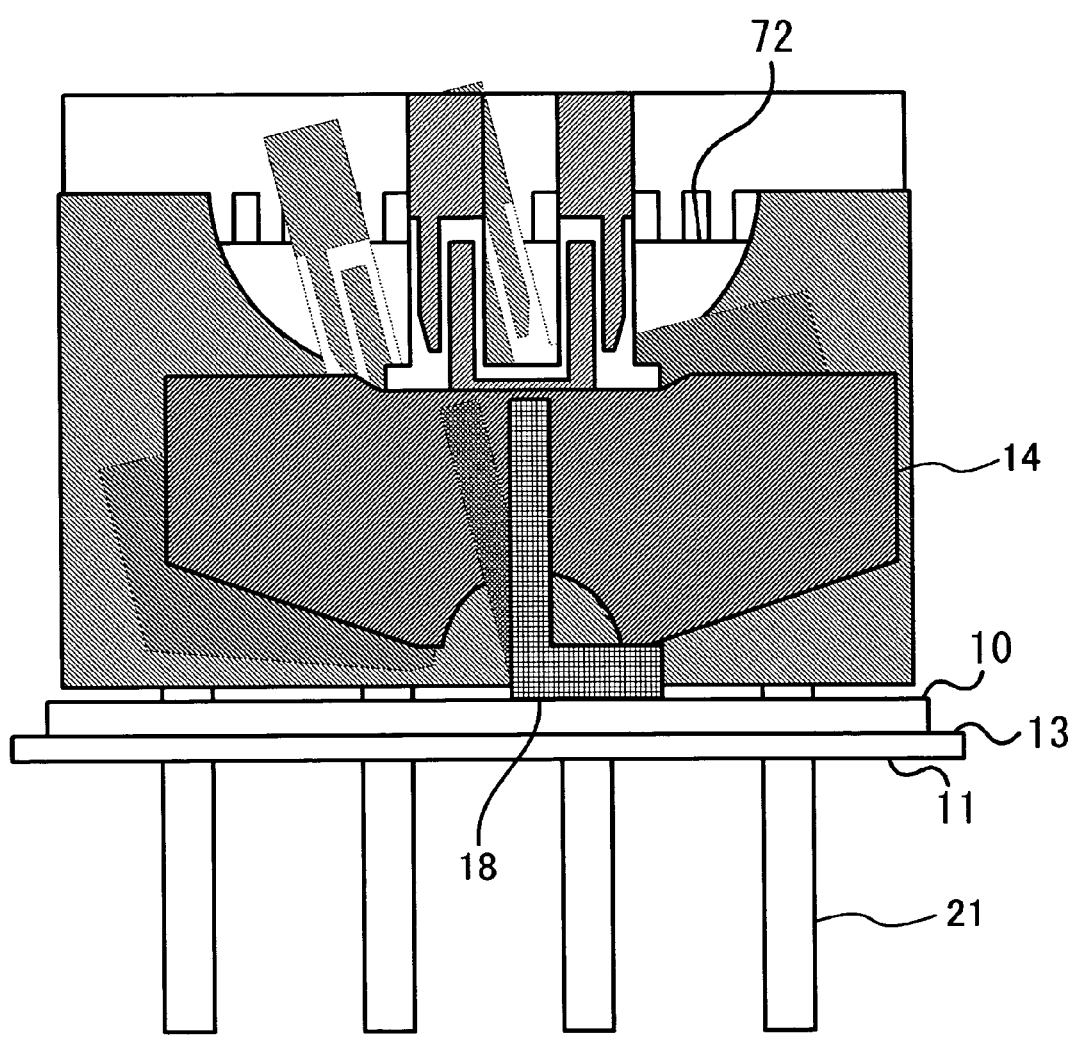
FIG. 8 is a front view of the angular velocity sensor in accordance with the first embodiment of the present invention.

FIG. 8 is a front view of the angular velocity sensor. FIG. 8 shows a combined view of FIGS. 2 and 3. A referential numeral 72 shows electronic components such as IC, resistor, and capacitor. These electronic components 72 are mounted on the circuit board 20, and are coupled via an interconnection pattern that is arranged on the circuit board 20. The circuitry formed on the circuit board 20 will be described later in detail. A cap, which is not shown, is attached to a flange 13 shown in FIGS. 2, 3, and 8. The cap seals the vibrator 12 and the circuit board 20 to protect the inside of the angular velocity sensor.

Figure 9:
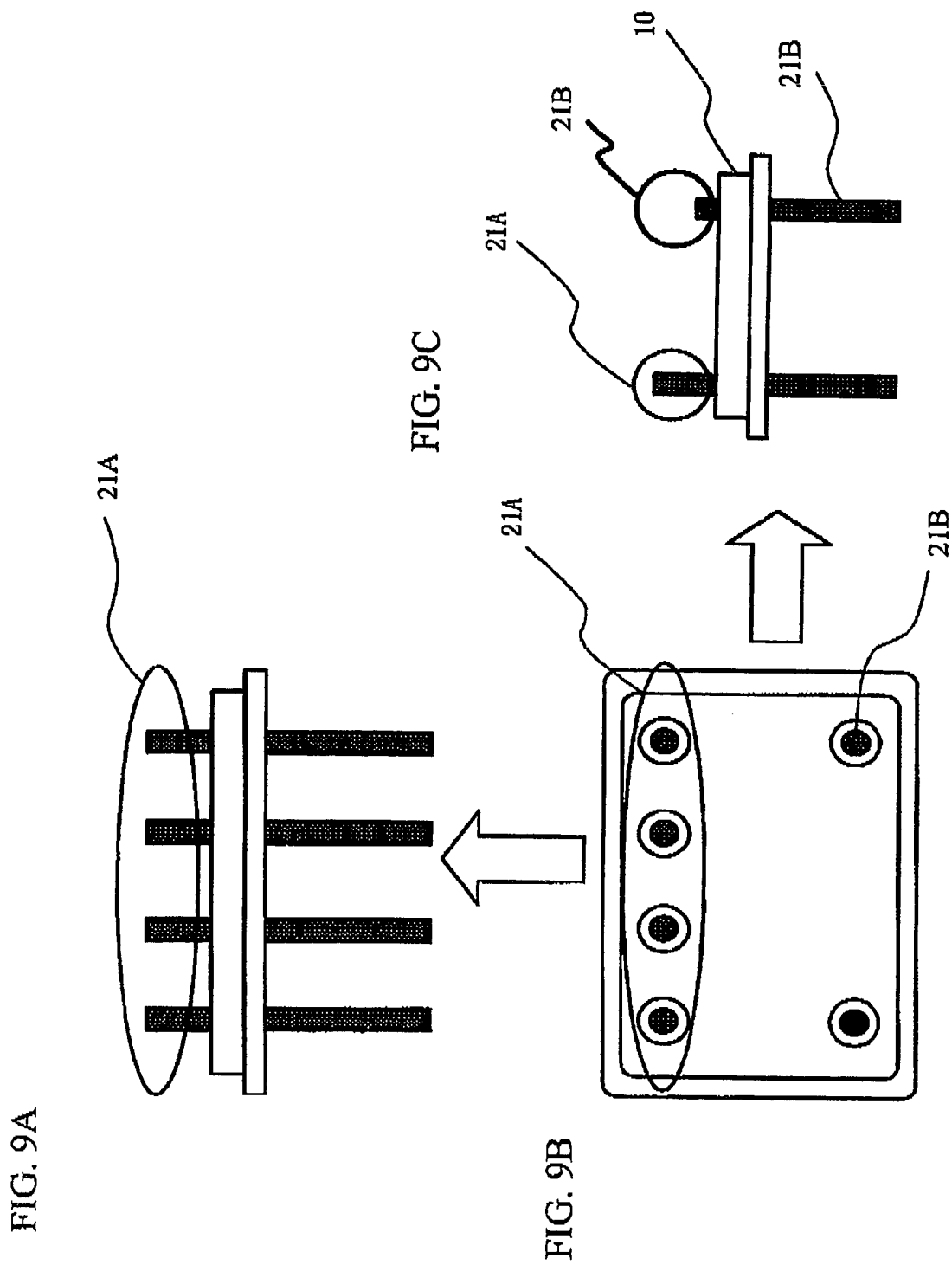
FIG. 9A is a front view of the support in accordance with the first embodiment of the present invention.
FIG. 9B is a plain view of the support in accordance with the first embodiment of the present invention.
FIG. 9C is a side view of the support in accordance with the first embodiment of the present invention

FIGS. 9A through 9C show the support 10. FIG. 9A is a front view, FIG. 9B is a plain view, and FIG. 9C is a side view. The external connection terminal 21 has a pin-shape, and six external connection terminals 21 are provided in accordance with the first embodiment of the present invention. These external connection terminals 21 pierce the support 10. Upper parts 21A of four external connection terminals 21 are arranged in line, and are circled for a better understanding as shown in FIGS. 9A through 9G. The upper parts 21A are in contact with pads that are arranged on the backside of the circuit board 20, as will be described later in detail. Lower parts of the external connection terminals 21 are inserted into holes that are formed on a substrate such as a motherboard, and are secured by soldering. Upper parts 21B of the remaining two external connection terminals 21 are not in contact with the pads arranged on the circuit board 20. That is, the upper parts 21B are shorter than the upper parts 21A. The above-mentioned two external connection terminals 21 may be dummy terminals, and may actually be used as external connection terminals.

Figure 10:
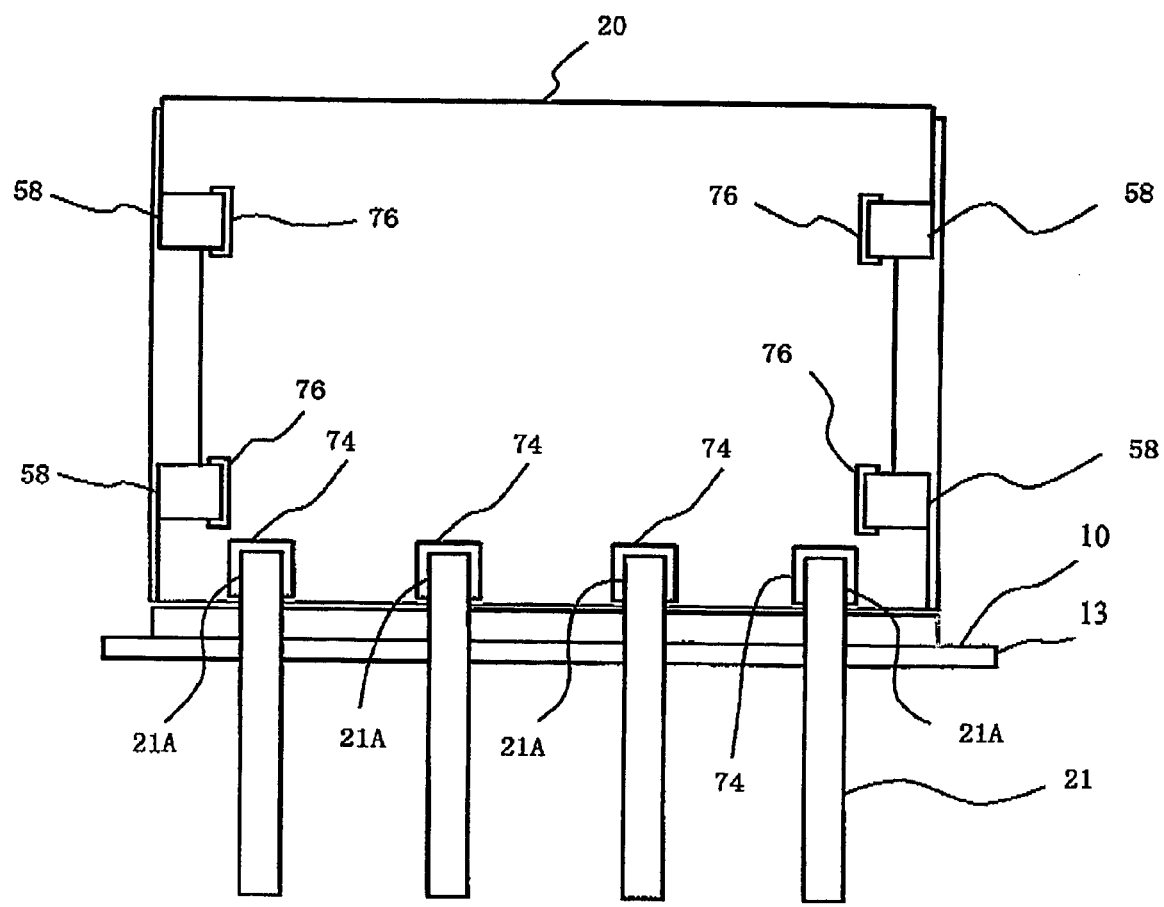
FIG. 10 is a back view of the angular velocity sensor in accordance with the first embodiment of the present invention.

FIG. 10 is a back view of the angular velocity sensor. Pads 74 and 76 are arranged on the backside of the circuit board 20. The pads 74 are respectively soldered onto the upper parts 21A of the external connection terminals 21. The circuit board holding portions 58 of the frame 16 are folded inward, and are soldered onto the pads 76. Two of the four external connection terminals 21 respectively serve as a signal terminal and a ground terminal to apply driving signals. The remaining two external connection terminals 21 also serve as the signal terminal and the ground terminal to output angular velocity detecting signals. The pads 76 serve as ground terminals of the circuitry that is arranged on the circuit board 20. The circuitry is electronically coupled to the frame 16 through the multiple pads 16, and the frame 16 serves as an extremely excellent shield. The pads 76 may be omitted. In this case, the shield may be connected to the external connection terminals 21 that serve as the ground on the circuit board 20. Thus, the frame 16 serves as the shield.

Figure 11A:
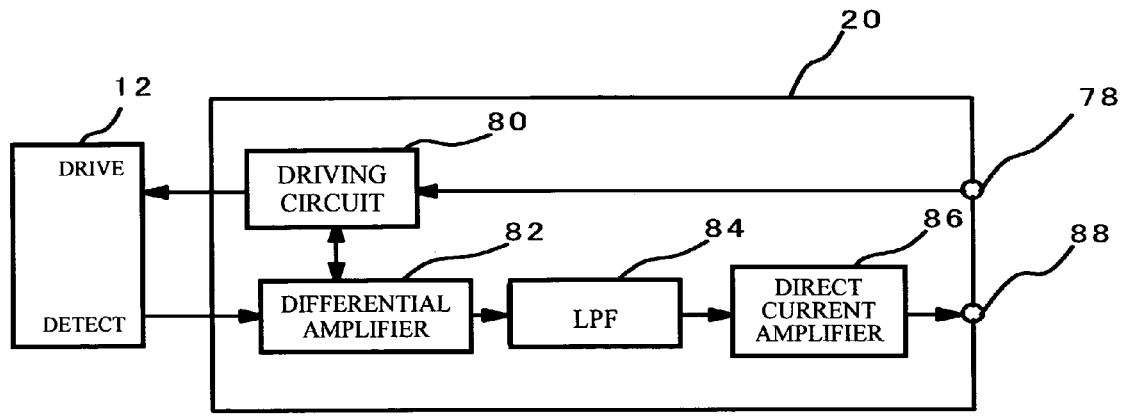
FIG. 11A is a circuit diagram provided on a circuit board in accordance with the first embodiment of the present invention.
Figure 11B:
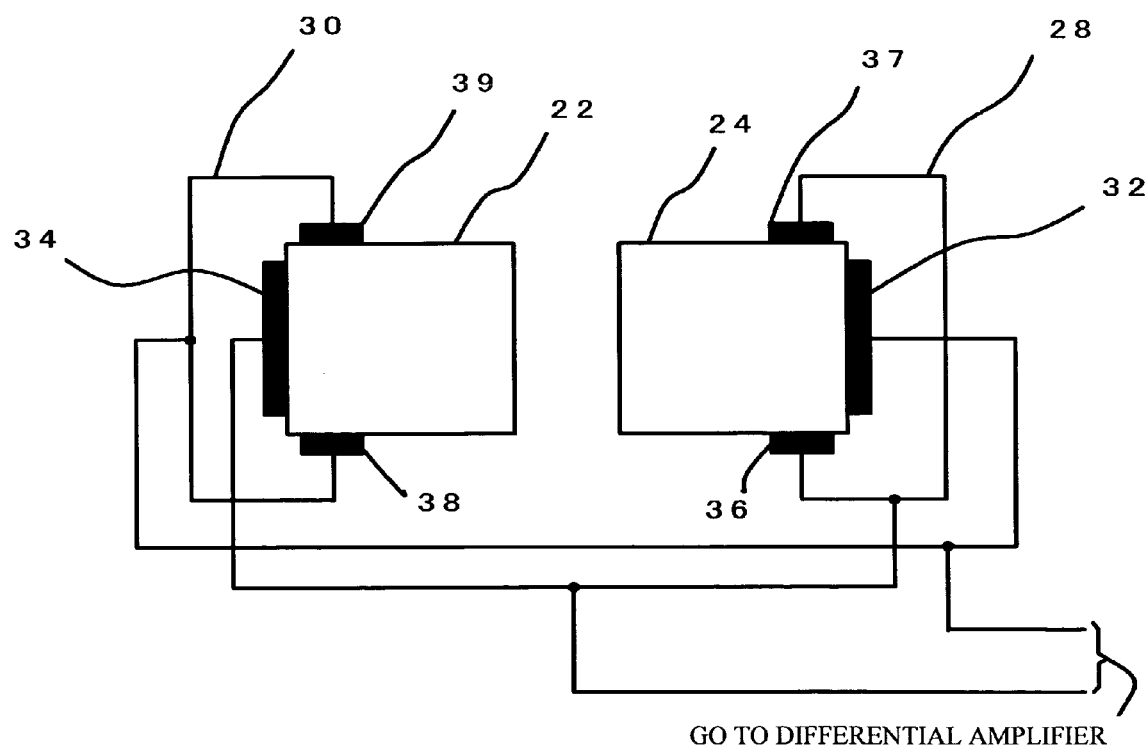
FIG. 11B shows a connection diagram of detection electrodes in accordance with the first embodiment of the present invention.

FIG. 11A is a circuit diagram provided on the circuit board 20. FIG. 11B shows a connection diagram of the detection electrodes 32, 34, 36, 37, 38, and 39. A driving signal input terminal 78, a driving circuit 80, a differential amplifier 82, a low pass filter (LPF) 84, a direct-current amplifier 86, and a detection signal output terminal 88 are arranged on the circuit board 20. The driving signal input terminal 78 and the detection signal output terminal 88 correspond to the pads 74 as shown in FIG. 10. The driving circuit 80 receives the driving signals from the outside through the driving signal input terminal 78, and applies a driving voltage to the driving electrodes 44 and 46. The two arms 22 and 24, to which the driving voltage has been applied, conduct in-plane vibration. In the above-mentioned situation, when the angular velocity that centers on the detection axis is applied, an electric field is generated inside the arms 22 and 24. The differential amplifier 82 differentially amplifies the voltages of the detecting electrodes 38, 39, and 32 and those of the detecting electrodes 36, 37, and 34. The driving circuit 80 operates in synchronization with the differential amplifier 82. An output voltage from the differential amplifier 82 passes through the LPF 84, and is amplified by the direct-current amplifier 86. Direct current voltage outputted from the direct-current amplifier 86 is applied to the detection signal output terminal 88 as an angular velocity detection signal.

The features of the first embodiment of the present invention will be enumerated as follows. The angular velocity sensor includes the support 10 and the vibrator 12 that is supported by the support 10. The vibrator 12 is inclined to the mounting surface 11 of the support 10. Thus, the detection axis can be set in a proper direction, that is, the direction perpendicular to the reference plane such as the ground surface, even if the surface on which the angular velocity sensor is installed is inclined to the ground surface. The angle of inclination of the vibrator 12 to the mounting surface 11 is adjustable, and it is possible to install the angular velocity sensor at an arbitrary angle. The angular velocity sensor includes the holding member 18.that is deformable, and the holding member 18 holds the vibrator 12. It is thus possible to set the detection axis of the vibrator 12 in a desired direction, by deforming the holding member 18. The holding member 18, which is made of a single material, is folded. Therefore, it is easy to produce the holding member 18. The angular velocity sensor has a relatively simple structure including the vibrator supporting substrate 14, the circuit board 20, and the frame 16. The frame 16 holds the vibrator supporting substrate 14 and the circuit board 20. The angular velocity sensor is capable of adjusting the angle of the detection axis arbitrarily. The frame 16 also has a simple structure, sandwiching and holding the vibrator supporting substrate 14. In the case where the frame 16 and the holding member 18 are made of a single member, the frame 16 is made of a deformable material. The frame 16 is engaged with multiple sides of the circuit board 20, and is capable of supporting the circuit board 20 readily. The circuit board 20 is arranged on a first side of the frame 16, and the vibrator 12 and the vibrator supporting substrate 14 are arranged on a second side of the frame 16. Thus, the angular velocity sensor has a compact structure. The vibrator supporting substrate 14 includes the concave portion 53, and the frame 16 includes a holding member that is fit into the concave portion 53. It is thus easy to assemble and is possible to hold the vibrator 12 securely. The angular velocity sensor is connected to electrodes (such as the driving electrodes and the detecting electrodes) that are arranged on the vibrator 12, and includes the multiple external connection terminals 21 that pierce the support 10. Thus, the angular velocity sensor is able to connect to the outside readily. The angular velocity sensor includes the circuit board 20 on which the circuitry connecting to the vibrator 12 is arranged (FIGS. 11A and 11B). The pads 76 are arranged on the circuit board surface so as to connect to the outside. Therefore, the angular velocity sensor has a great flexibility when connected to the outside. The angular velocity sensor includes the frame 16 that is arranged to cover the circuit board 20. The circuit board holding portions 58 of the frame 16, which is engaged with the circuit board 20, are in contact with the pads 76. Thus, the frame 16 can serve as a shield member readily. In addition, the angular velocity sensor includes the support 10, the vibrator 12, and the holding member 18 that holds the vibrator 12 on the support 10. The holding member 18 is deformable. The angle of the detection axis of the vibrator 12 is adjustable by deforming the holding member 18. It is thus possible to set the detection axis to be vertical to the reference plane, even if the angular velocity sensor is inclined to the reference plane.

Second Embodiment

Figure 12A:
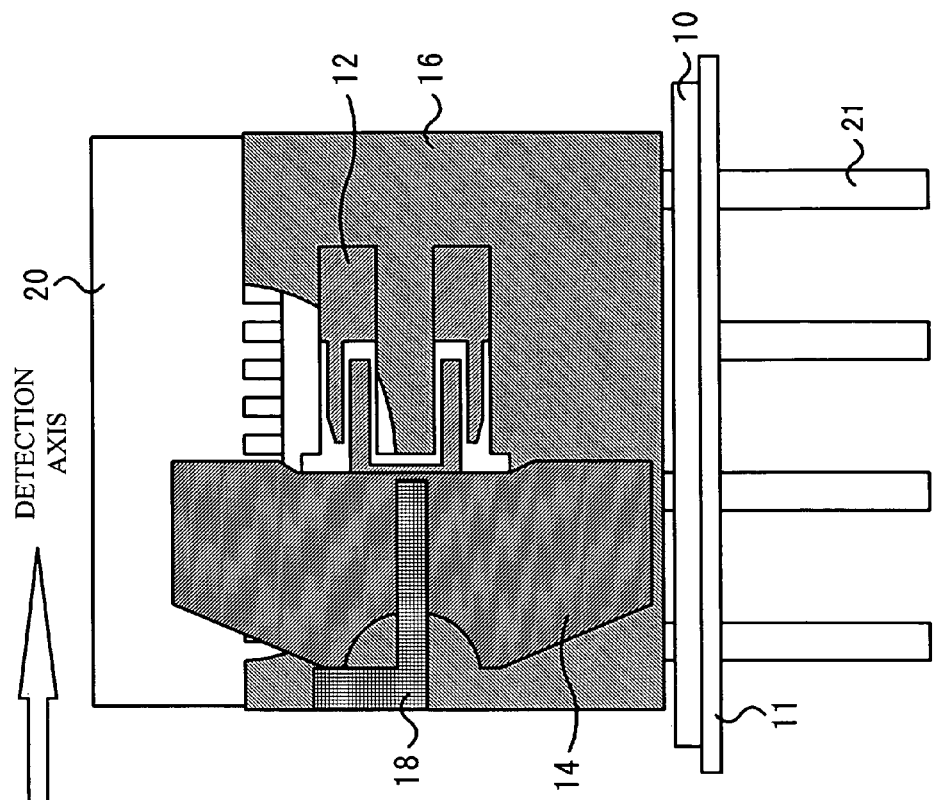
FIGS. 12A and 12B are front views of an angular velocity sensor in accordance with a second embodiment of the present invention.
Figure 12B:
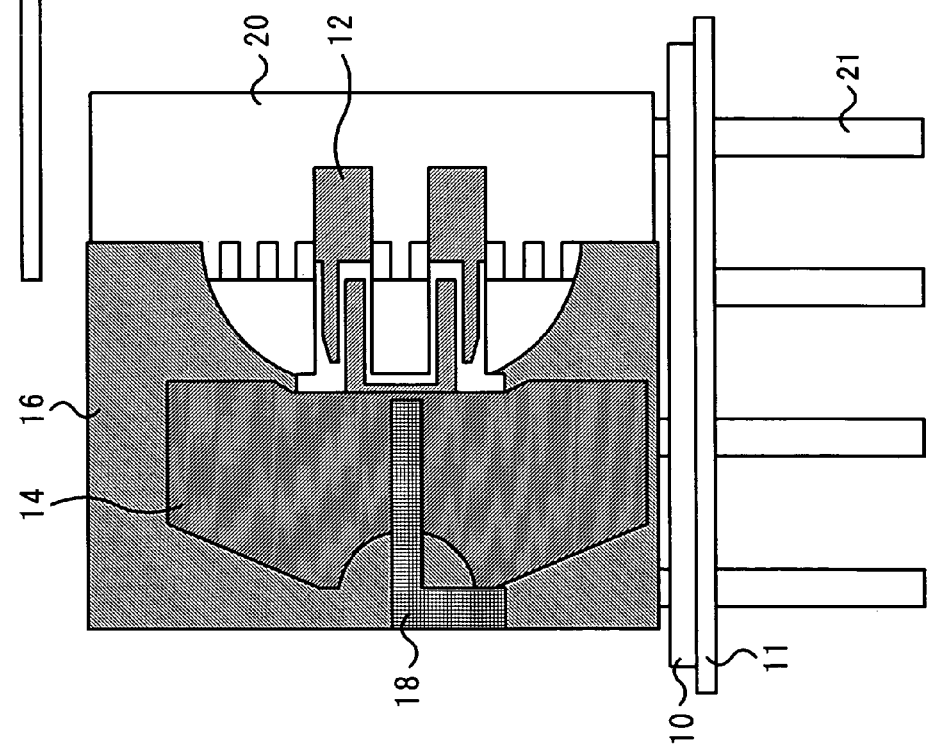

FIGS. 12A and 12B are front views of an angular velocity sensor in accordance with a second embodiment of the present invention. The second embodiment of the present invention is a variation of the first embodiment of the present invention. FIG. 12A includes the vibrator 12, the vibrator supporting substrate 14, the frame 16, the holding member 18, and the circuit board 20 of the first embodiment, which are rotated 90 degrees clockwise. FIG. 12B includes the vibrator 12, the vibrator supporting substrate 14, and the holding member 18 that are rotated 90 degrees clockwise. Referring to FIG. 12A, the holding member 18 is parallel to the mounting surface 11 of the support 10, and the detection axis is parallel to the mounting surface 11. However, if the holding member 18 is rotated counterclockwise, the holding member 18 can be inclined to the mounting surface 11. Referring to FIG. 12B, the holding member 18 is parallel to the mounting surface 11 of the support 10, and the detection axis is parallel to the mounting surface 11. However, if the holding member 18 is rotated clockwise, the holding member 1 8 can be inclined to the mounting surface 11.

The angular velocity sensor with the above-mentioned configuration has the same mechanism and effects as in the first embodiment of the present invention. In addition, in the case of employing the two angular velocity sensors respectively in accordance with the first and the second embodiments of the present invention together, it is possible to detect two angular velocities according to the two detection axes. Also, it is possible that the first and the second embodiments of the present invention have the same size substantially, and thereby to produce the angular velocity sensors having an identical size, although the sensors have different detection axes. This makes it possible to arrange and mount the angular velocity sensors with a great flexibility. Further, it is possible to detect three angular velocities according to the three detection axes, by adding another angular velocity sensor in accordance with the second embodiment of the present invention.

Third Embodiment

Figure 13:
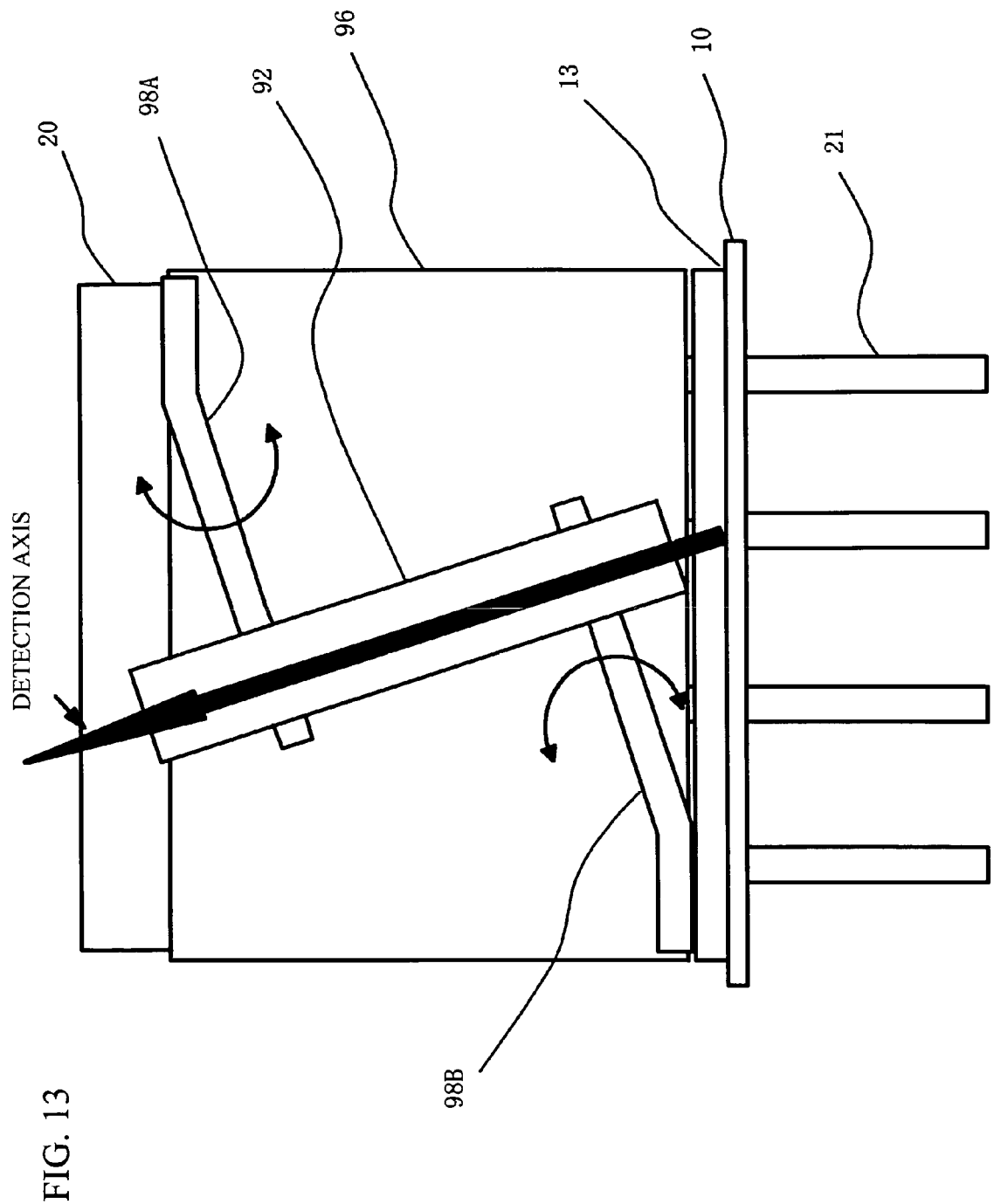
FIG. 13 is a front view of the angular velocity sensor in accordance with a third embodiment of the present invention.

FIG. 13 is a front view of the angular velocity sensor in accordance with a third embodiment of the present invention. A block-shape of a vibrating reed vibrator 92 is employed for the vibrator. Two holding members 98A and 98B hold around the edges of a longer side of the block-shape of the vibrating reed vibrator 92. The holding members 98A and 98B are part of the frame 96. That is, a single member is folded to shape the frame 96 and the holding members 98A and 98B. The holding member 98A is arranged on the upper side of the frame 96, and is tilted counterclockwise. The holding member 98B is arranged on the lower side of the frame 96, which is in a diagonal relationship with the holding member 98A, and is tilted counterclockwise at the same degrees as the holding member 98A. The vibrating reed vibrator 92 is held by those holding members 98A and 98B. The conventional techniques may be employed for the driving electrodes and the detecting electrodes. The above-mentioned electrodes and the circuit board 20 are connected by the use of wires or the like.

As described, with the angular velocity sensor that employs the vibrating reed vibrator 92, the detection axis of the vibrating reed vibrator 92 is arbitrarily adjustable by deforming the two holding members 98A and 98B.

The first through third embodiments of the present invention have been described.

The present invention provides the angular velocity sensor that can appropriately adjust the detection axis to the reference plane for the angular velocity detection, even if the sensor is installed on an inclined surface. In addition, the present invention also provides the angular velocity sensor that can adjust the direction of the detection axis readily.

The present invention is not limited to the above-mentioned embodiments, and other embodiments, variations and modifications may be made without departing from the scope of the present invention.

What is claimed is:

1. An angular velocity sensor comprising:
   a support member;
   a vibrator that is supported on the support member;
   a circuit board supported on the support member; and
   a holding member that holds the vibrator on the support member, the holding member having a deformable shape that allows the angle of inclination of the vibrator to the support member to be changed on a plane parallel to the circuit board so that an angle of a detection axis of the angular velocity sensor is adjustable by deforming the holding member.

2. The angular velocity sensor as claimed in claim 1, wherein the vibrator is a tuning fork vibrator having multiple arms arranged side by side on the plane.

3. The angular velocity sensor as claimed in claim 1, wherein the holding member is a single member that is folded and processed into the holding member.

4. The angular velocity sensor as claimed in claim 1, further comprising:
   a vibrator supporting substrate to which the vibrator is attached; and
   a frame that is adjacent to the vibrator supporting substrate and the circuit board.

5. The angular velocity sensor as claimed in claim 4, wherein the vibrator supporting substrate has a concave portion, and wherein the holding member fits into the concave portion.

6. The angular velocity sensor as claimed in claim 1, further comprising:
   a vibrator supporting substrate to which the vibrator is attached; and
   a frame that is adjacent to the vibrator supporting substrate and the circuit board,
   wherein the frame sandwiches and holds the circuit board.

7. The angular velocity sensor as claimed in claim 1, further comprising:
   a vibrator supporting substrate to which the vibrator is attached; and
   a frame that is adjacent to the vibrator supporting substrate and the circuit board,
   wherein the frame is made of a deformable material and the holding member is intregal with the frame.

8. The angular velocity sensor as claimed in claim 1, further comprising:
   a vibrator supporting substrate to which the vibrator is attached; and
   a frame that is adjacent to the vibrator supporting substrate and the circuit board,
   wherein the frame is engaged with multiple sides of the circuit board.

9. The angular velocity sensor as claimed in claim 1, further comprising:
   a vibrator supporting substrate to which the vibrator is attached; and
   a frame that is adjacent to the vibrator supporting substrate and the circuit board,
   wherein the circuit board is arranged on a first side of the frame and the vibrator and the vibrator supporting substrate are arranged on a second side of the frame.

10. The angular velocity sensor as claimed in claim 1, wherein the vibrator is connected to electrodes that are arranged on the vibrator, and has external connection terminals that pierce the support member.

11. The angular velocity sensor as claimed in claim 1, wherein the circuit board includes a circuitry connected to the vibrator and pads for external connection.

12. The angular velocity sensor as claimed in claim 1, further comprising:
   a frame that is provided to cover the circuit board, wherein the circuit board includes a circuitry connected to the vibrator and pads for external connection, and wherein the frame has a circuit board holding portion and is in contact with the pads, the circuit board holding portion being engaged with the circuit board.

13. The angular velocity sensor as claimed in claim 1, further comprising:
   a vibrator supporting substrate to which the vibrator is attached; and
   a frame that is adjacent to the vibrator supporting substrate and the circuit board,
   wherein the vibrator supporting substrate is composed of multiple layers.

14. The angular velocity sensor as claimed in claim 1, wherein the vibrator is a tuning fork vibrator.

15. The angular velocity sensor as claimed in claim 1, wherein the vibrator is a vibrating reed vibrator.

16. The angular velocity sensor as claimed in claim 1 wherein the holding member holds the vibrator so that the detection axis of the vibrator is inclined to the support member.

17. The angular velocity sensor as claimed in claim 1, wherein the holding member holds the vibrator so that the detection axis of the vibrator is parallel to the support member.

* * * * *